(12) United States Patent
Milillo et al.

(10) Patent No.: US 6,535,967 B1
(45) Date of Patent: Mar. 18, 2003

(54) METHOD AND APPARATUS FOR TRANSFERRING DATA BETWEEN A PRIMARY STORAGE SYSTEM AND A SECONDARY STORAGE SYSTEM USING A BRIDGE VOLUME

(75) Inventors: Michael Steven Milillo, Louisville, CO (US); David Beal, Tuscon, AZ (US); David Glenn Hostetter, Boulder, CO (US); Christopher J. West, Boulder, CO (US); Peter H. Tallman, Longmont, CO (US); Theresa Lynn Segura, Broomfield, CO (US); Scott Adam States, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/488,206

(22) Filed: Jan. 19, 2000

(51) Int. Cl.[7] ............................................... G06F 12/00
(52) U.S. Cl. ....................................... 711/162; 711/161
(58) Field of Search ................................. 711/161, 162

(56) References Cited

U.S. PATENT DOCUMENTS

| 5,155,845 | A | * | 10/1992 | Beal et al. ....................... 714/6 |
| 5,537,533 | A |   | 7/1996  | Staheli et al. |
| 5,555,371 | A | * | 9/1996  | Duyanovich et al. .......... 714/18 |
| 5,623,599 | A | * | 4/1997  | Shomler ....................... 714/18 |
| 5,692,155 | A | * | 11/1997 | Iskiyan et al. ............... 711/162 |
| 5,720,029 | A |   | 2/1998  | Kern et al. |
| 5,835,954 | A | * | 11/1998 | Duyanovich et al. ........ 711/162 |
| 6,131,148 | A | * | 10/2000 | West et al. .................. 711/162 |

FOREIGN PATENT DOCUMENTS

| WO | 97 35269 | 9/1997 |
| WO | 99 50747 | 10/1999 |

* cited by examiner

Primary Examiner—Reba I. Elmore
(74) Attorney, Agent, or Firm—Carstens, Yee & Cahoon, L.L.P.

(57) ABSTRACT

A method and apparatus for transferring data from a first storage system to a second storage system in which the first storage system includes a first plurality of storage devices and the second storage system includes a second plurality of storage devices. Data is transferred using a pair of devices selected for transferring data for all of the storage devices. Data to be transferred from source storage devices within the first plurality of storage devices is placed or queued on a selected primary storage device within the first plurality of storage devices. The data is sent to a selected secondary storage device within the plurality of storage devices. The data is relocated from the selected secondary storage device to target storage devices within the second plurality of storage devices.

55 Claims, 8 Drawing Sheets 99-078-ICE

METHOD AND APPARATUS FOR TRANSFERRING DATA BETWEEN A PRIMARY STORAGE SYSTEM AND A SECONDARY STORAGE SYSTEM USING A BRIDGE VOLUME

BACKGROUND OF THE INVENTION

1. Technical Field

The present invention relates generally to an improved data processing system and in particular to a method and apparatus for transferring data. Still more particularly, the present invention relates to a method and apparatus for transferring data between a primary storage system and a secondary storage system.

2. Description of Related Art

With increasingly large amounts of data being handled in data processing systems, storage systems, such as disk storage subsystems are being used to store data. Some organizations rely heavily on data and quick access to the data. Disasters caused by environmental conditions, user errors, or application errors may occur in which access to the data is lost for some period of time. Mirroring or copying data to a secondary storage system from primary storage system is currently employed to minimize the time in which access to data is lost due to a disaster.

Peer-to-peer remote copy (PPRC) is a synchronous copy mechanism that creates a copy of data at a remote or secondary storage system. This copy, at the secondary storage, is kept current with the data located at the primary storage system. In other words, a copy of the data located at a secondary storage system is kept in synch with the data at the primary storage system, as observed by the user of the data. Volume pairs are designated in which a volume in a primary system is paired with a volume in the secondary storage system.

With a PPRC system, a PPRC data copy to the recovery or secondary storage system occurs synchronously from the host point of view with write operations to volumes in the primary storage system. With presently available techniques for copying data, multiple disks in a primary storage system contend for paths connecting the primary system to the secondary storage system. When data is written from a host to the primary storage system, the data written to a particular volume is also written to a corresponding volume in the secondary storage system using a path to the secondary storage system. A limit is present to the number of paths that may be used for data transfers. As a consequence, contention may occur for these paths to transfer data from volumes in the primary system to the secondary system. This type of contention causes performance inefficiencies in the system as a whole.

Data transfer occurs in pairs in which data is transferred from a volume in a primary storage system to a corresponding volume in a secondary storage system. These transfers require sets of remote copy commands to be used for each pair to use the paths to transfer data between the volumes in the pair. These sets of commands for data transfers are also referred to as "chains". For example, a sequence using a series of start and end chains is a high overhead operation. Further, hand shaking is used to identify the status of each command in a chain. This hand shaking introduces additional overhead in a transfer of data from a primary system to a secondary system. This overhead decreases performance because the application system disk write by the host is not considered complete until the secondary system write has been completed. As a result, a completion of a write operation may take far longer than the write to the primary storage system itself. Consequently, performance will decrease as traffic increases with increasing numbers of volumes in storage systems.

Therefore, it would be advantageous to have an improved method and apparatus for transferring data between storage systems.

SUMMARY OF THE INVENTION

The present invention provides a method and apparatus for transferring data from a first storage system to a second storage system in which the first storage system includes a first plurality of storage devices and the second storage system includes a second plurality of storage devices. Data is transferred using a pair of devices selected for transferring data for all of the storage devices. Data to be transferred from source storage devices within the first plurality of storage devices is placed or queued on a selected primary storage device within the first plurality of storage devices. The data is sent to a selected secondary storage device within the plurality of storage devices. The data is transferred from the selected secondary storage device to target storage devices within the second plurality of storage devices.

Further, a second pair of devices may be used to return status information to the first storage system from the second storage system. The sending of status information is uncoupled from the sending of data such that the transfer of data and the return of status information is performed asynchronously without requiring a return of status information before transferring additional data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
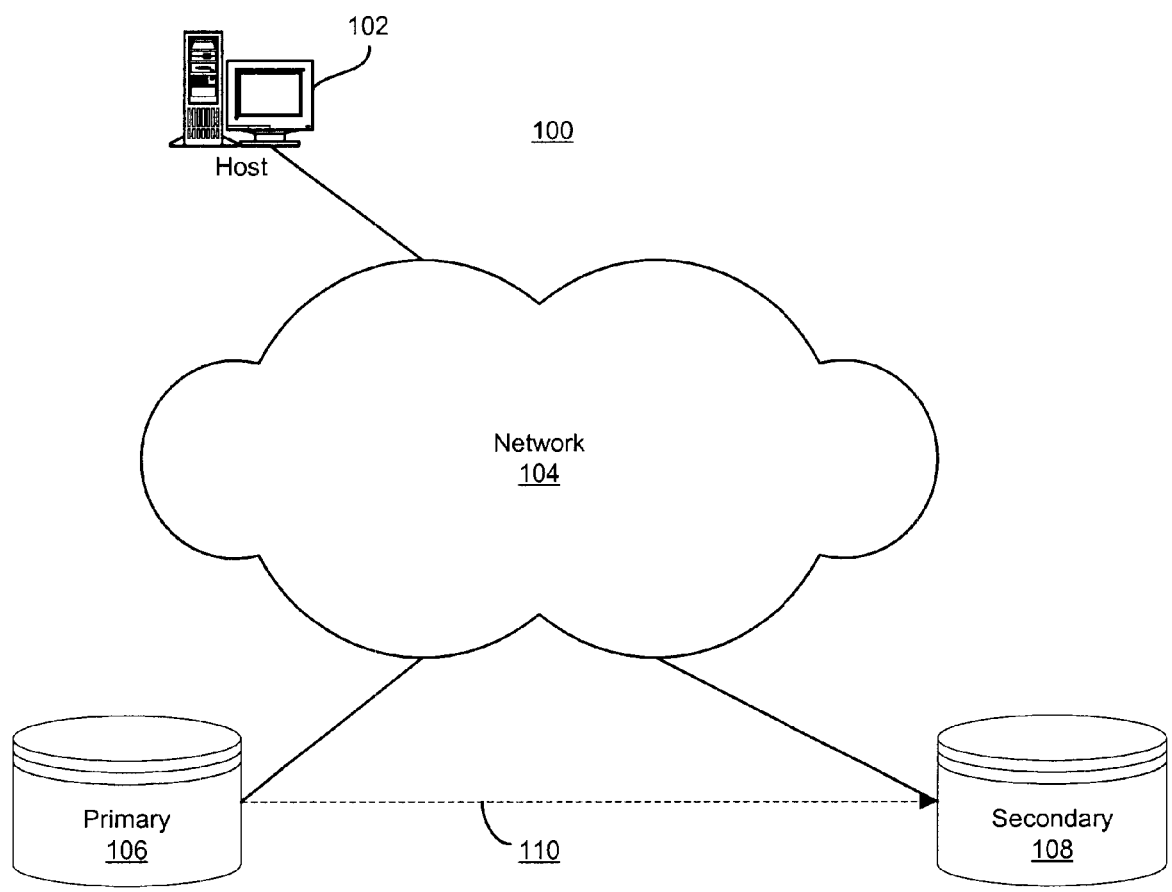
FIG. 1 is a diagram of a data processing system in which the present invention may be implemented.

With reference now to the figures and with reference in particular to FIG. 1, a diagram of a data processing system is depicted in which the present invention may be implemented. Data processing system 100 includes a host 102, which has a connection to network 104. Data may be stored by host 102 in primary storage system 106. Data written to primary storage system 106 is copied to secondary system 108 in these examples. The copy process is used to create a copy of the data in primary storage system 106 in secondary storage system 108. In these examples, the copy process is a peer-to-peer remote copy mechanism. In such a system, a write made by host 102 is considered complete only after the data written to primary storage system 106 also is written to secondary system 108.

In these examples, host 102 may take various forms, such as a server on a network, a Web server on the Internet, or a mainframe computer. Primary storage system 106 and secondary storage system 108 are disk systems in these examples. Specifically, primary storage system 106 and secondary storage system 108 are each set up as shared virtual arrays to increase the flexibility and manageability of data stored within these systems. Network 104 may take various forms, such as, for example, a local area network (LAN), a wide area network (WAN), the Internet, or an intranet. Network 104 contains various links, such as, for example, fiber optic links, packet switched communication links, enterprise systems connection (ESCON) fibers, small computer system interface (SCSI) cable, and wireless communication links. FIG. 1 is intended as an example of a data processing system in which the present invention may be implemented and not as an architectural limitation to the present invention. For example, host 102 and primary storage system 106 may be connected directly while primary storage system 106 and secondary storage system 108 may be connected by a LAN or WAN. Further, primary storage system 106 and secondary storage system 108 may be connected to each other by a direct connection 110, rather than through network 104.

The present invention allows for data from different volumes located within primary storage system 106 to be sent to secondary storage system 108 using a single set of processes to setup and tear down a path or connection between these two storage systems. This mechanism avoids having to set up and tear down a path or connection for a data transfer between each pair of volumes. The mechanism of the present invention involves using a bridge volume pair in which a bridge volume is located on each storage system. A single path or connection is set up between the two bridge volumes and data is transferred from the primary bridge volume on primary storage system 106 to a secondary bridge volume on secondary storage system 108. These two bridge volumes handle the transfer of data for all of the volume pairs. A separate pair of volumes, status bridge volumes, are used to transfer status information about the data transfers.

Figure 2:
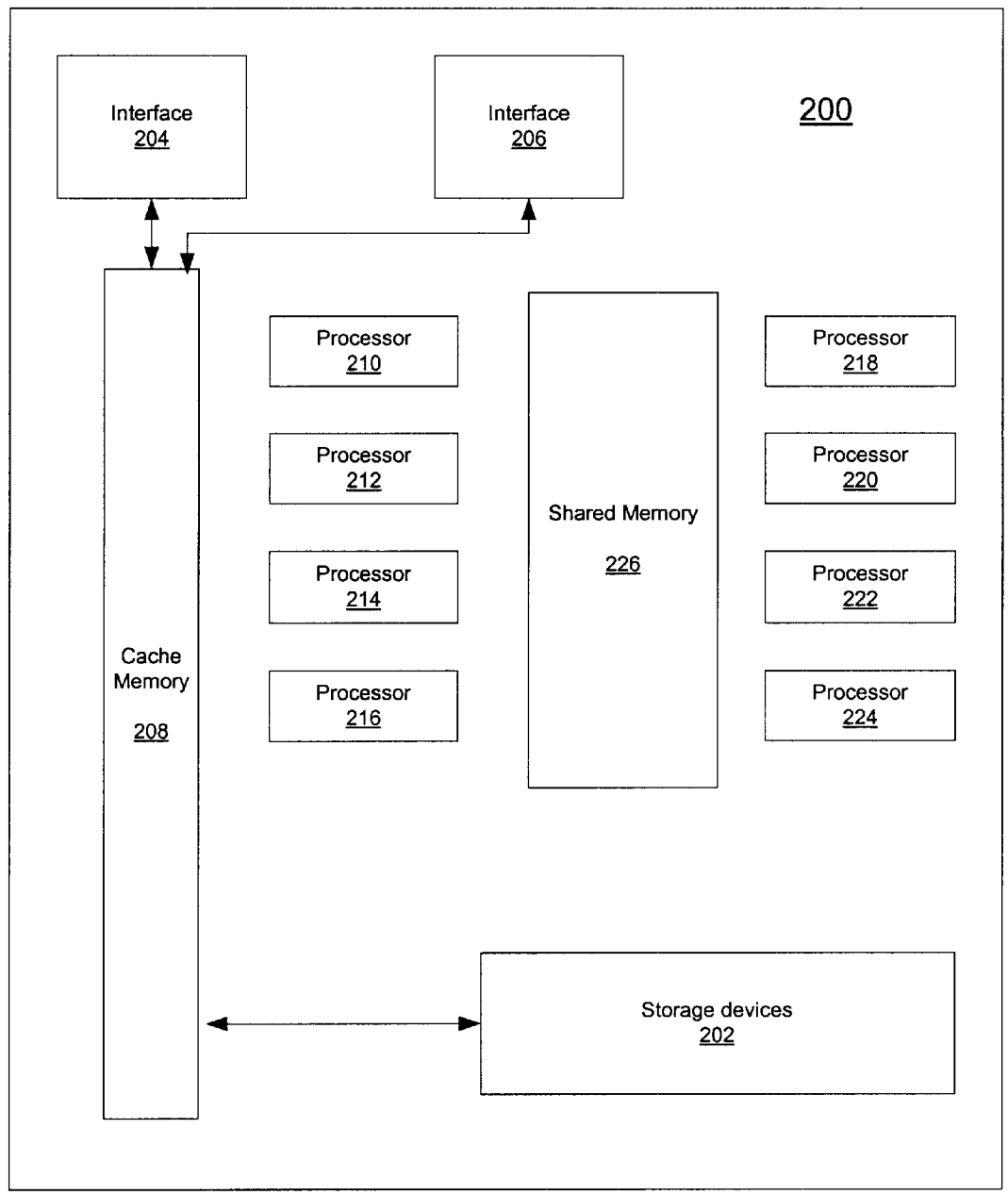
FIG. 2 is a block diagram of a storage system in accordance with a preferred embodiment of the present invention.

Turning next to FIG. 2, a block diagram of a storage system is depicted in accordance with a preferred embodiment of the present invention. Storage system 200 may be used to implement primary storage system 106 or secondary storage system 108 in FIG. 1. As illustrated in FIG. 2, storage system 200 includes storage devices 202, interface 204, interface 206, cache memory 208, processors 210–224, and shared memory 226.

Interfaces 204 and 206 in storage system 200 provide a communication gateway through which communication between a data processing system and storage system 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage system 200 is a shared virtual array. Storage system 200 is a virtual storage system in that each physical storage device in storage system 200 may be represented to a data processing system, such as host 100 in FIG. 1, as a number of virtual devices. In this example, storage devices 202 are a set of disk drives set up as a redundant array of inexpensive disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and manage the reading and writing of data to storage devices 202. In this example, processors 210–224 are used to write data addressed using a virtual volume to the physical storage devices. For example, a block of data, such as a track in a virtual volume, may be received by interface 204 for storage. A track is a storage channel on disk, tape, or other storage media. On disks, tracks are concentric circles (hard and floppy disks) or spirals (CDs and videodiscs). On tapes, tracks are arranged in parallel lines. The format of a track is determined by the specific drive in which the track is used. On magnetic devices, bits are used to form tracks and are recorded as reversals of polarity in the magnetic surface. On CDs, the bits are recorded as physical pits under a clear, protective layer. This data is placed in cache memory 208. Processors 210–224 will write the track of data for this volume into a corresponding virtual volume set up using storage devices 202.

The present invention provides a method, apparatus, and instructions for transferring data between two storage systems. The mechanism of the present invention may be implemented in disk systems using peer-to-peer remote copy (PPRC). The mechanism of the present invention is a virtual remote copy mechanism in which a single pair of volumes, one located in the primary storage system and one located in the secondary storage system, handles all of the traffic of all pairs transferring data between the primary and secondary storage systems. Each track that is transmitted from a primary volume to a secondary volume is mapped as a track of the bridge volume. The bridge volume draws from the entire collection of primary tracks across all primary volumes to be sent to the secondary as its own collection of tracks. The mechanism allows the tracks to be mapped onto a track of the bridge primary volume prior to transmission and mapped back from the secondary bridge volume to the intended target track after the transmission. As a result, the pair of bridge volumes can maintain virtually unbounded chains of track transfers and reduce the overhead operations of switching chains when sending tracks for multiple primary volumes.

The mechanism packages meta-data within the transfer track to identify the original track source and destination. This allows the bridge to transfer the track from any primary volume to any secondary volume.

The mechanism also allows the status of each track transfer to be packaged on a separate pair of bridge volumes for transfer from the secondary subsystem back to the primary subsystem. This de-couples the status presentation from the transfers that are occurring on the other bridge pair. This de-coupling allows uninterrupted transmission of the tracks without waiting for final status for each track. In general, the track transfers proceed with normal status while the true success or failure status is sent asynchronously on a separate transmission back to the primary subsystem.

The illustration of storage system 200 in FIG. 2 is not intended to imply architectural limitations of the present invention. Storage system 200 may be implemented using a number of available storage systems modified to provide a pair of volumes used to handle data transfer between the other volumes pairs in a primary storage system and a secondary storage system. For example, a Shared Virtual Array (9393-6) system available from Storage Technology Corporation located in Louisville, Colo. may be used to implement the present invention.

Figure 3:
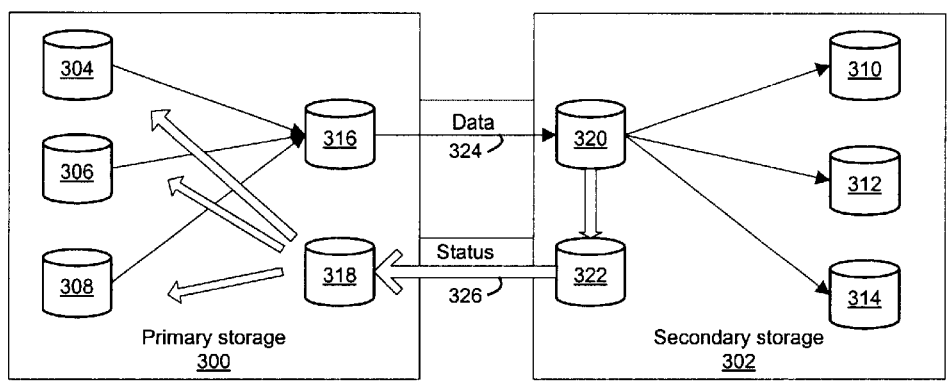
FIG. 3 is a block diagram illustrating data flow paths used to transfer data between a primary storage system and a secondary storage system in accordance with a preferred embodiment of the present invention.

With reference next to FIG. 3, a block diagram illustrating data flow paths used to transfer data between a primary storage system and a secondary storage system is depicted in accordance with a preferred embodiment of the present invention. Primary storage system 300 sends data to secondary storage system 302 each time data is written to primary storage system by a data processing system, such as host 102 in FIG. 1. Primary storage 300 and secondary storage 302 may be implemented using a storage system, such as, for example, storage system 200 in FIG. 2.

Primary storage system 300 in this example includes a first set of volumes, volumes 304–308. Secondary storage system 302 includes a second set of volumes, volumes 310–314, which correspond to the first set of volumes in primary storage 300. The correspondence between the volumes in these two storage systems is set up in pairs, such that a volume in primary storage system 300 has a corresponding volume in secondary storage system 302 to form the pair. For example, volume 304 is paired with volume 310, volume 306 is paired with volume 312, and volume 308 is paired with volume 314.

Further, primary storage system 300 includes a primary data bridge 316 and a secondary status bridge 318. Secondary storage system 302 includes a secondary data bridge volume 320 and a primary status bridge volume 322. Volumes in each of the storage systems are designated for use in transferring data. As a result of this selection and configuration, primary data bridge volume 316, secondary status bridge volume 318, secondary data bridge volume 320, and primary status bridge volume 322 are reserved for internal use by the two storage systems 300 and 302.

With the bridge volumes defined, two paths, data bridge path 324 and status bridge path 326 are established between primary storage system 300 and secondary storage system 302. Data bridge path 324 begins at primary data bridge volume 316 in primary storage system 300 and ends at secondary data bridge volume 320 in secondary storage system 302. Status bridge path 326 begins at primary status bridge volume 322 in secondary storage system 302 and ends at secondary status bridge volume 318 in primary storage system 300. Data bridge path 324 is used to transfer data from primary data bridge volume 316 to secondary data bridge volume 320, while status bridge path 326 is used to transfer status information from primary status bridge volume 322 to secondary status bridge volume 318. Data written to volumes 304–308 are transferred to corresponding volumes 310–314. In the depicted examples, the data is in the form of tracks that are copied from a primary volume to a secondary volume.

Data from different volumes in primary storage 300 are queued at primary data bridge volume 316 and transferred to secondary data bridge volume 320. From secondary bridge volume 320, the data is relocated to the corresponding volume of the pair in secondary storage 302. This relocating step with virtual volumes involves converting and saving the data to the target volume. Converting means changing the track identifier from the bridge volume to the correct target volume. For example, data transferred from a volume, such as volume 304 to volume 310, is transferred using primary data bridge volume 316 and secondary data bridge volume 320. The data is transferred from volume 304 to primary data bridge volume 316. This data is then transferred using data bridge path 324 to secondary data bridge volume 320. When the data is received at secondary data bridge volume 320, the data is then converted and saved to volume 310. If data is to be transferred from volume 306 to volume 312, the same data path, data bridge path 324 may be used.

Status information is sent from volume 320 and queued on primary status bridge volume 322. After the status information is received on primary status bridge volume 322, status information is returned using status bridge path 326. No requirement is present for status information to be received confirming the writing of data to a secondary volume before data from a primary volume can be written to a corresponding secondary volume. In other words the transfer of data and the return of status information may occur asynchronously.

In accordance with a preferred embodiment of the present invention, these transfers for different volumes may occur without having to incur the overhead normally required for such transfers. The mechanism of the present invention allows for the data path to be maintained until all data transfers from primary storage 300 to secondary storage 302 have been completed. This mechanism is in contrast to the requirement to establish a data path to transfer data between volumes in a pair, release or tear down the data path after the data transfer has occurred and establish another data path to transfer data between volumes in a second pair.

Figure 4:
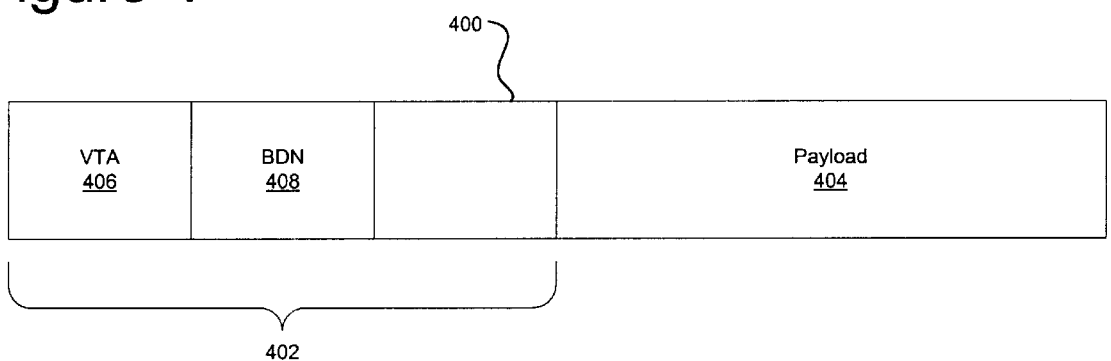
FIG. 4 is a diagram of a data packet in accordance with a preferred embodiment of the present invention.

In transferring tracks of data from a primary volume to a corresponding secondary volume, the target volume is identified such the data can be relocated to the correct volume once received at the secondary data bridge volume. Turning next to FIG. 4, a diagram of a data packet is depicted in accordance with a preferred embodiment of the present invention. Data packet 400 includes a header 402 and a payload 404. Payload 404 contains data for a track that is being transferred from a primary volume to a secondary volume. The data in payload 404 may be compressed depending on the implementation. Header 402 includes a virtual track address (VTA) 406 and a bridge device number (BDN) 408. VTA 406 is used to relocate the data to the appropriate volume once the data is received at the secondary data bridge volume. BDN 408 is set such that the data bridge volume will handle the data in data packet 400 rather than the device or volume specified in VTA 406. Although only VTA 406 and BDN 408 are illustrated in header 402, other information not shown also may be included. Data packet 400 may be placed into the payload of another data packet for actual transport from a primary storage system to a secondary storage system.

Figure 5A:
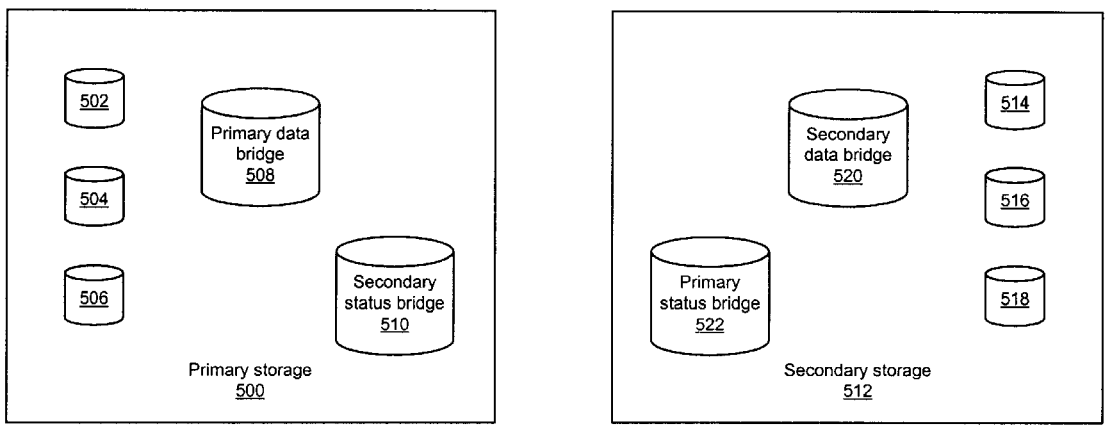
FIGS. 5A–5D are diagrams illustrating establishment of a data bridge path and pair and a status bridge path and pair in accordance with a preferred embodiment of the present invention.

Turning now to FIGS. 5A–5D, diagrams illustrating establishment of a data bridge path and pair and a status bridge path and pair are depicted in accordance with a preferred embodiment of the present invention. The paths illustrated in FIG. 3 may be established using a set of commands to designate volumes as bridge volumes and to designate and establish paths. In FIG. 5A, primary storage 500 contains volumes 502–506, primary data bridge 508, and secondary status bridge volume 510. Secondary storage 512 contain volumes 514–518, secondary data bridge volume 520, and primary status bridge 522. Volumes 502–506 are currently configured for use to store data while primary data bridge volume 508 and secondary status bridge volume 510 have been configured by a user logging in and selecting unconfigured volumes and configuring the selected volumes for use as a bridge rather than as a volume for use in storing data. In secondary storage 512, a similar selection has been made to select secondary data bridge volume 520 and primary status bridge volume 522.

Figure 5B:
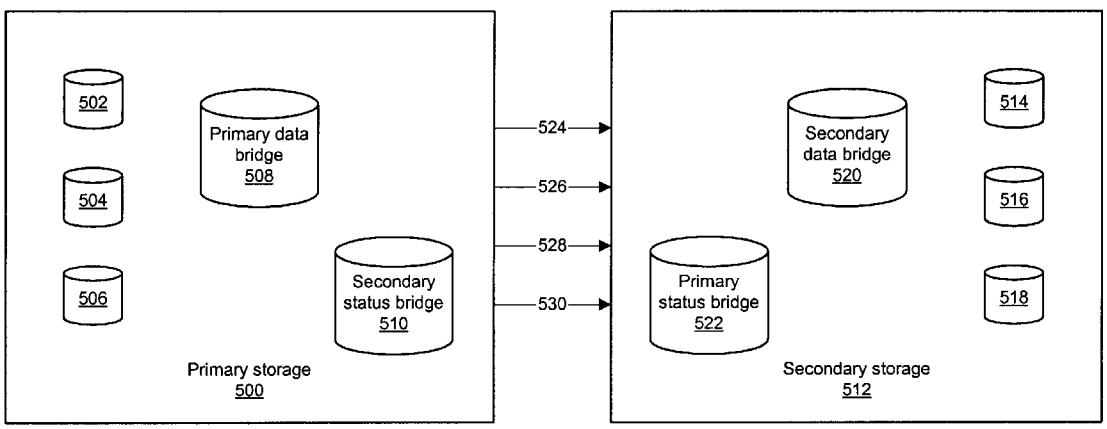

Next, in FIG. 5B, at least two paths are established between primary storage 500 and secondary storage 512. The paths are established using establish path commands. In this example, these commands are direct access storage device commands sent in an ESCON command frame. One path will be used as a data bridge path and another path will be used as a status bridge path. In this example, four paths, paths 524–530, have been established to secondary storage 512 from primary storage 500. Next, an establish pair command is issued to primary data bridge 508.

Figure 5C:
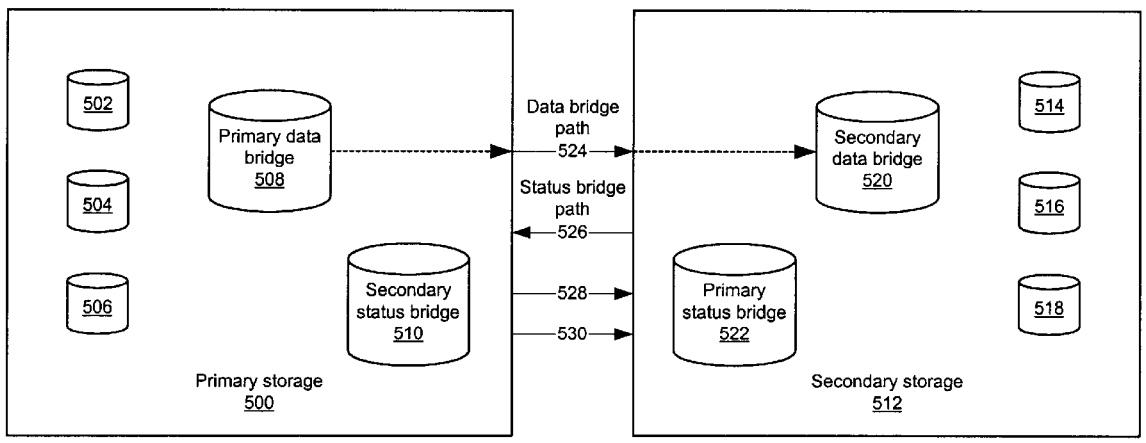

In FIG. 5C, path configuration occurs after the establish pair command has been issued to establish pairs of bridge volumes. Two available paths between primary storage 500 secondary storage 512 are identified. One path is designated as the data bridge path. In this example, path 524 becomes the data bridge path. An establish path command is issued to secondary storage 512 to establish a status bridge path from secondary storage 512 back to primary storage 500. In this example, path 526 is the status bridge path.

Figure 5D:
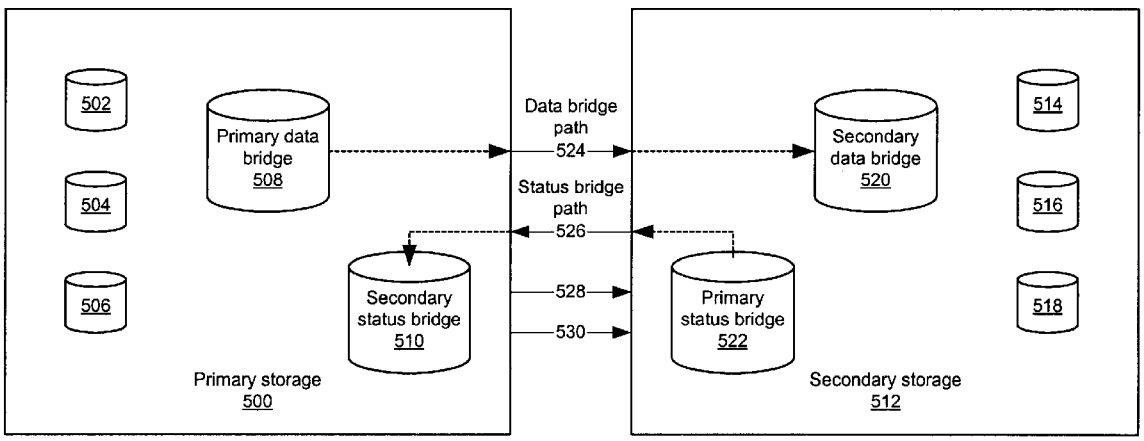

Next, in FIG. 5D, an establish pair command is issued from primary storage 500 across data bridge path 524 to establish a status bridge pair between primary status bridge volume 522 and secondary status bridge volume 510. This path is path 526 and is established from primary status bridge volume 522 to secondary status bridge volume 510. After both these pairs have been established, data may be sent to secondary storage 512 from primary storage 500 using primary data bridge volume 508, secondary data bridge volume 520, secondary status bridge volume 510, and primary status bridge volume 522. The tracks of data may then be sent using data bridge path volume 524 in the manner described above in FIG. 3.

In this example, only one data bridge path and status bridge path are established. Another data bridge and status bridge path could be established using paths 528 and 530.

Figure 6:
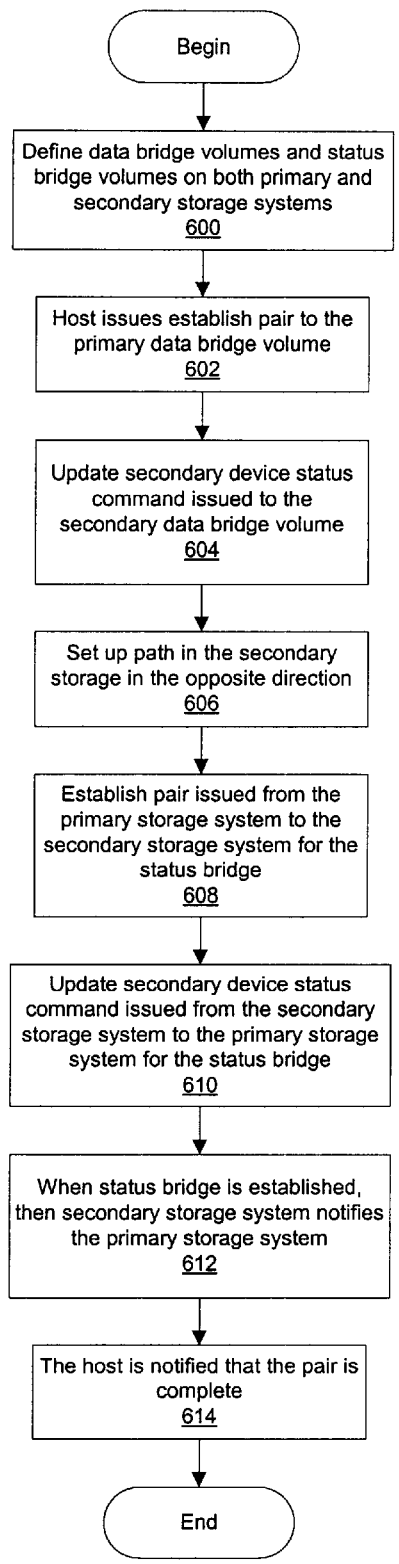
FIG. 6 is a flowchart of a process for setting up a data bridge and a status bridge in accordance with a preferred embodiment of the present invention.

With reference now to FIG. 6, a flowchart of a process for setting up a data bridge and a status bridge is depicted in accordance with a preferred embodiment of the present invention. The process begins by defining data bridge and status bridge volumes on the primary and secondary storage systems (step 600). Step 600 may be initiated by a user at the host computer or from some other computer. Next, an establish pair command is issued by the host computer to the primary data bridge volume (step 602). An update secondary device status command is sent to the secondary data bridge volume (step 604).

Next, a path is set up in the opposite direction from the secondary storage system to the primary storage system (step 606). An establish pair command is then issued in the primary subsystem to the secondary subsystem for the status bridge (step 608). An update secondary device status command is sent from the secondary storage system to the primary storage system for the status bridge (step 610). A notification is sent from the secondary storage system to the primary storage system when a status bridge is established (step 612). The host system is notified by the primary storage system that the pair is complete (step 614) with the process terminating thereafter.

In transferring tracks from a primary storage system to a secondary storage system, a network link, such as a WAN link, with bridge paths and pairs is employed in these examples. A track is transferred from one data bridge volume to another data bridge volume using the network link. This transfer may be characterized using four phases: a primary data transfer, a secondary data transfer, a status packet send, and a status packet received.

Figure 7:
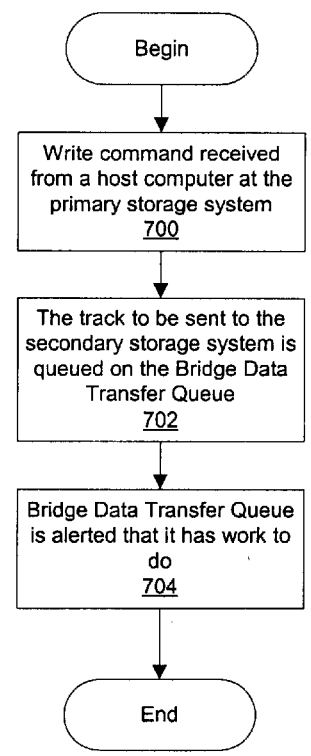
FIG. 7 is a flowchart of a process for queuing data for transfer from a primary storage system to a secondary storage system in accordance with a preferred embodiment of the present invention.
Figure 8:
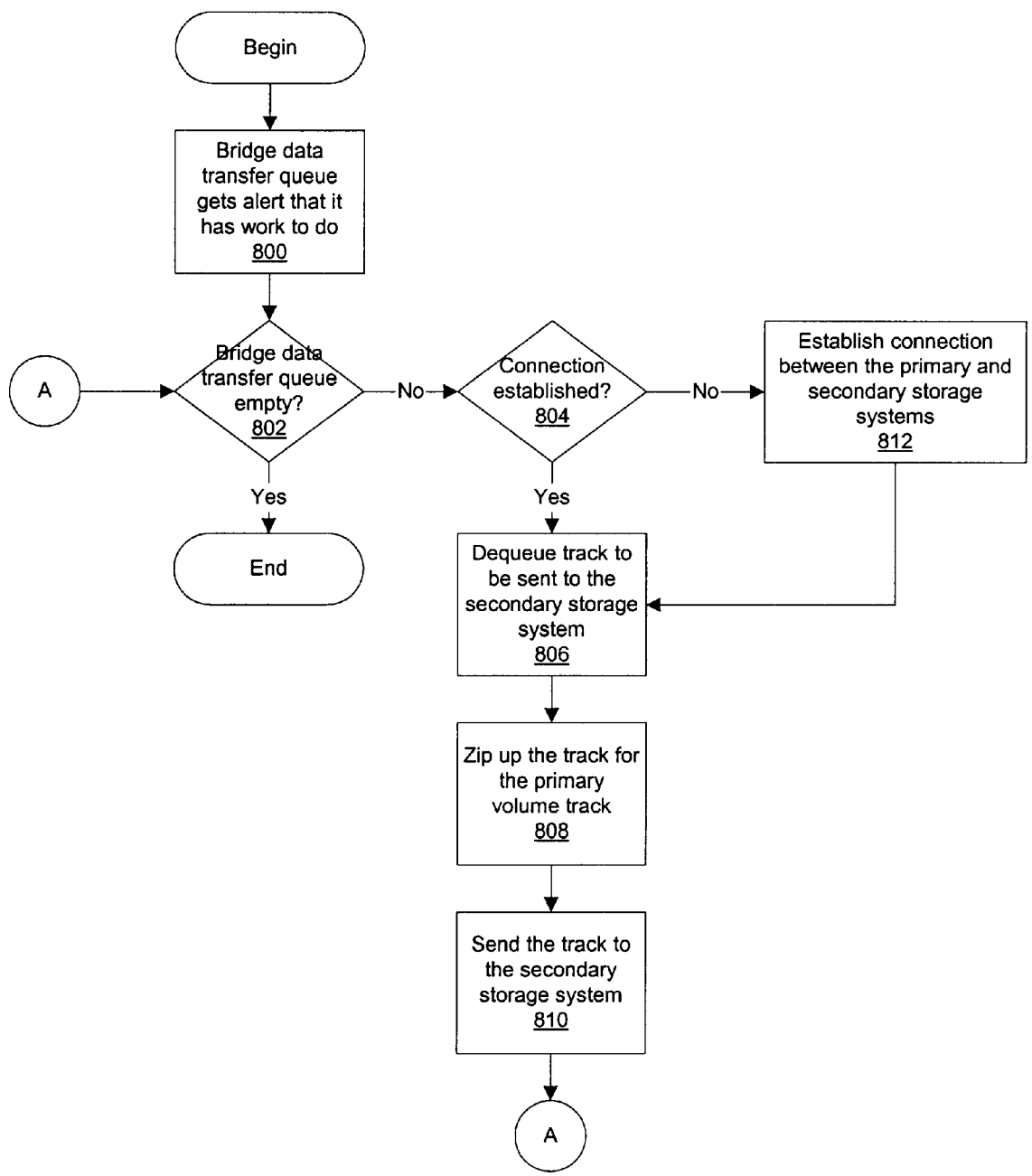
FIG. 8 is a flowchart of a process used to transfer data from a queue in a primary storage system to a secondary storage system in accordance with a preferred embodiment of present invention.

With reference now to FIGS. 7 and 8, flowcharts of processes used in a primary data transfer for sending data from a primary storage system to a secondary data storage system using bridge volumes is depicted in accordance with a preferred embodiment of the present invention. The steps illustrated in FIGS. 7 and 8 illustrate a logical series of events used to process a single track. This process is repeated for each track that is to be sent to a secondary storage system.

Turning now to FIG. 7, a flowchart of a process for queuing data for transfer from a primary storage system to a secondary storage system is depicted in accordance with a preferred embodiment of the present invention.

The process begins by receiving a write command from a host computer at the primary storage system (step 700). Thereafter, the track containing the data is placed into a queue for transfer to the secondary storage system (step 702). In this example, the queue is referred to as the bridge data transfer queue. Next, the bridge data transfer queue is alerted that work is present for processing (step 704) with the process terminating thereafter.

With reference now to FIG. 8, a flowchart of a process used to transfer data from a queue in a primary storage system to a secondary storage system is depicted in accordance with a preferred embodiment of present invention. The process begins by receiving an alert that work is present for processing (step 800). A determination is made as to whether the bridge data transfer queue is empty (step 802). If the queue is empty, the process terminates.

Otherwise, A determination is made as to whether a connection has been established to the secondary storage system (step 804). If a connection is present, the track is dequeued from the queue to be sent to the secondary storage system (step 806). The data bridge volume may be used to chain the track with other tracks from the list of tracks to be sent to the secondary storage system. In these examples, tracks are associated with each other or linked to each other sequentially to form a chain of tracks for transfer. In this manner, tracks from multiple devices may be sent without the overhead of a start and end of chain for each track. Instead, the mechanism of the present invention allows for this overhead to be incurred once for multiple tracks for different devices.

The track for the primary volume that is to be transferred is prepared and then zipped up for transfer (step 808). In step 808, the track is placed into a payload of a data packet, such as data packet 400 illustrated in FIG. 4. Part of the preparation of the track in step 808 includes setting the bridge device number so that the secondary bridge volume will handle the data rather than the device specified in the virtual track address.

Figure 9:
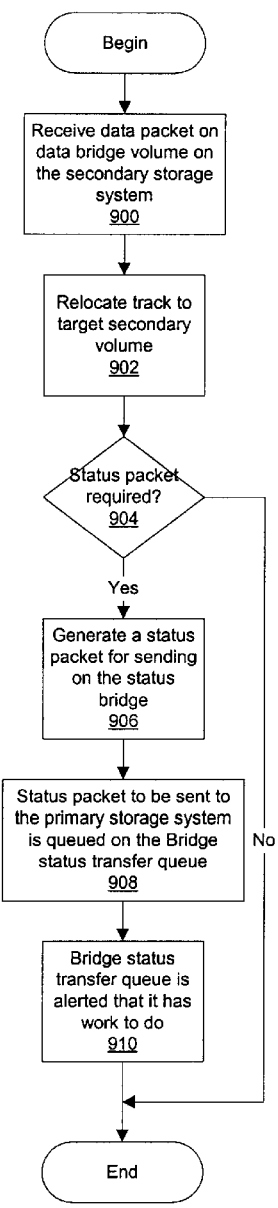
FIG. 9 is a flowchart of a process used in a secondary data transfer at a secondary storage system in accordance with a preferred embodiment of the present invention.
Figure 10:
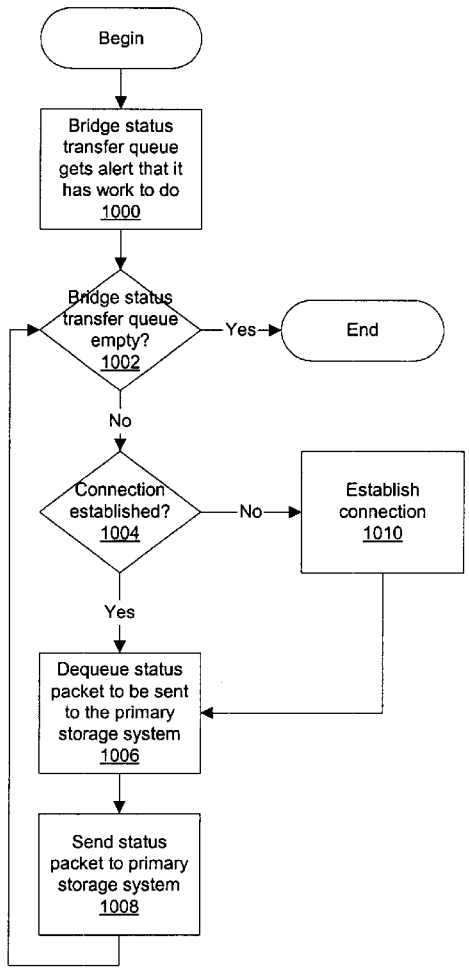
FIG. 10 is a flowchart of a process used in a status packet send in accordance with a preferred embodiment of the present invention.

Thereafter, the data packet containing the track is sent to the secondary storage system (step 810) with the process returning to step 802 thereafter. With reference again to step 804, if a connection has not been established to the secondary storage system, the connection is then established (step 812) with the process then proceeding to step 806 as described above. FIGS. 9 and 10 illustrate the processes implemented on a secondary storage system used to process data received from a primary storage system and to generate status information. Turning to FIG. 9, a flowchart of a process used in a secondary data transfer at a secondary storage system is depicted in accordance with a preferred embodiment of the present invention. The process begins by receiving a data packet on the secondary data bridge volume in the secondary storage system (step 900). The track is then relocated to the target volume on the secondary storage system using the virtual track address (step 902). A determination is then made as to whether a status packet is required (step 904). If a status packet is not required, the process terminates.

Otherwise, a status packet is generated for sending on the status bridge (step 906). The status packet to be sent to the primary storage system is queued on a bridge status transfer queue on the secondary storage system (step 908). The bridge status transfer queue is alerted that status information is present for transfer (step 910) with the process terminating thereafter.

With reference now to FIG. 10, a flowchart of a process used in a status packet send is depicted in accordance with a preferred embodiment of the present invention. This process is initiated when a track is written to a volume in the secondary storage system and a status packet is received. The process begins by receiving an alert that work is present for processing (step 1000). A determination is made as to whether the bridge status transfer queue is empty (step 1002). If the queue is empty, the process terminates.

Otherwise, A determination is made as to whether a connection has been established to the primary storage system (step 1004). If a connection is present, the status packet is dequeued from the queue for sending to the primary storage system (step 1006). The status packet is then sent to the primary storage system over the status bridge (step 1008) with the process then returning to step 1002 as described above.

With reference again to step 1004, if a connection has not been established, a connection is established between the primary storage system and the secondary storage system (step 1010) with the process then proceeding to step 1006 as described above.

Figure 11:
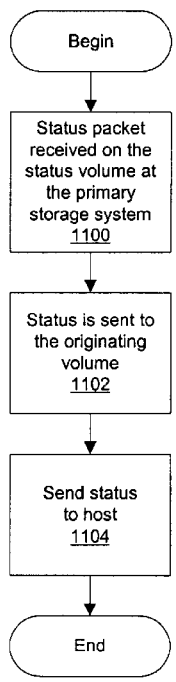
FIG. 11 is a flowchart of a process used in a status packet receive in accordance with a preferred embodiment of the present invention.

Turning next to FIG. 11, a flowchart of a process used in a status packet receive is depicted in accordance with a preferred embodiment of the present invention.

The status packet is received on the secondary status bridge volume (step 1100). The status for the transfer of the track is sent to the originating volume in the primary storage system (step 1102). The originating volume is the source volume of the track as opposed to the primary data bridge volume. If the status packet is for the last track sent to the secondary storage device, the status is sent back to the host indicating that the write has been completed (step 1104) with the process terminating thereafter.

Thus, the present invention provides an improved mechanism for transferring data from a primary storage system to a secondary storage system in which the data transferred is handled by a set of volumes configured to transfer data and return status information for other volumes in the storage systems. The use of dedicated volumes for transferring data reduces the number of requests to establish paths and release paths to transfer data between volume pairs. A path is a connection or link established to transfer data over a physical medium, such as a cable or network, connecting the storage systems. As a result, a separate chain of commands establishing and releasing a path is not required to transfer data on different volume pairs. In this manner, a path may be established and used to transfer data for a number of different volume pairs. The reduction in these requests decreases the overall time used to set up data transfers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, if data is compressed in the payload's data packets, the processes illustrated above will include the necessary steps to compress and decompress the data. In addition, although the depicted example is directed towards virtual volumes, the present invention also may be applied to physical volumes. With physical volumes, relocating of data involves an actual transfer or movement of data from one physical volume to another physical volume. The processes also may be applied to data transfers other than PPRC. The processes also may be applied to various types of storage media other than disk drives. For example, the mechanism of the present invention also may be applied to optical drives or tape drives. Further, a status bridge may be omitted and all data transfer and status information may be handled through the use of just the data bridge. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transferring data from a first storage system to a second storage system, wherein the first storage system includes a first plurality of storage devices and the second storage system includes a second plurality of storage devices, the method comprising:

establishing a data communication path between a primary data bridge virtual storage device in the first storage system and a secondary data bridge virtual storage device in the second storage system;

placing data to be transferred from source storage devices within the first plurality of storage devices on the primary data bridge virtual storage device;

sending the data from the primary data bridge virtual storage device to the secondary data bridge virtual storage device using the communication path; and relocating the data from the secondary data bridge virtual storage device to target storage devices within the second plurality of storage devices.

2. The method of claim 1, wherein the primary data bridge virtual storage device is reserved for internal use by the first storage system and the secondary data bridge virtual storage device is reserved for internal use by the second storage system.

3. The method of claim 1, wherein the data communication path is maintained until transfer of data from the source storage devices and the target storage devices has been completed.

4. The method of claim 1, wherein the data communication path is a network link.

5. The method of claim 1, further comprising:

generating status information for a status of data transferred to the target storage devices;

the status information on a primary status bridge virtual storage device in the second storage system; and transferring the status information to a secondary status bridge virtual storage device in the first storage system.

6. The method of claim 5, wherein transfer of data and transfer of status information occurs asynchronously.

7. The method of claim 5, wherein the transferring of the status information includes:

establishing a status communication path between the primary status bridge virtual storage device and the secondary status bridge virtual storage device; and sending the status information from the primary status bridge virtual storage device to the secondary status bridge virtual storage device using the status communication path.

8. The method of claim 1, wherein the first plurality of storage devices and the second plurality of storage devices are physical devices.

9. The method of claim 8, wherein the physical devices are disk drives.

10. The method of claim 1, wherein the first plurality of storage devices and the second plurality of storage devices are virtual devices.

11. A method for transferring data from a first storage system to a second storage system, wherein the first storage system having a first plurality of storage devices and the second storage system having a second plurality of storage devices, the method comprising:

responsive to a request to transfer data from source storage devices within the first plurality of storage devices to target storage devices within the second plurality of storage devices, establishing a link between a primary bridge virtual volume in the first storage system and a secondary bridge virtual volume in the second storage system;

placing data from the source storage devices on the primary bridge virtual volume;

sending the data from primary bridge virtual volume to the secondary bridge virtual volume using the link; and relocating the data from the secondary bridge virtual volume to the target storage devices.

12. The method of claim 11 further comprising:

configuring a first virtual storage device within the first plurality of storage devices as the primary bridge virtual volume; and configuring a second virtual storage device within the second plurality of storage devices as the secondary bridge virtual volume.

13. The method of claim 11, wherein the link is a network link.

14. The method of claim 11 further comprising:

generating status information for a status of data transferred to the target storage devices;

placing the status information on a primary status bridge virtual volume in the second storage system; and transferring the status information to a secondary status bridge virtual volume within the first storage system.

15. The method of claim 11, wherein the first plurality of storage devices and the second plurality of storage devices are physical devices.

16. The method of claim 15, wherein the physical devices are disk drives.

17. The method of claim 11, wherein the first plurality of storage devices and the second plurality of storage devices are virtual devices.

18. The method of claim 11, wherein the request is a write by a host to source storage devices in the first plurality of storage devices in the first storage system.

19. The method of claim 11, wherein the step of sending comprises:

placing the data into a data packet having a header and a payload, wherein the data is contained in the payload and information used to save the data to the target storage devices is contained in the header;

sending the plurality of data packets from the primary bridge virtual volume to the secondary bridge virtual volume using the link.

20. The method of claim 11, wherein the data comprises a plurality of tracks and wherein the step of placing the data includes associating the tracks as a group and wherein the step of sending the data comprises sending the group from the primary bridge virtual volume to the secondary bridge virtual volume using the link.

21. A storage system comprising:

a plurality of storage devices;

a data bridge virtual storage device;

an interface;

a controller, wherein the controller has a plurality of modes of operation including:

a first mode of operation in which the controller monitors the interface for a write from a host;

a second mode of operation, responsive to detecting the write, in which the controller, identifies a set of storage devices within the plurality of storage devices associated with the write;

a third mode of operation, responsive to identifying the set of storage devices, in which the controller sends data written to the set of storage devices to the data bridge virtual storage device;

a fourth mode of operation, responsive to sending the data to the bridge virtual storage device, in which the controller establishes a data path to another storage system through the interface;

a fifth mode of operation, responsive to establishing the data path to a second storage system, in which the controller sends the data from the data bridge virtual storage device to the second storage system.

22. The storage system of claim 21, wherein the controller further includes:
   a sixth mode of operation, responsive to detecting receipt of status information, in which the controller sends the status information to the host.

23. The storage system of claim 21, wherein the plurality of storage devices are a plurality of virtual storage devices.

24. The storage system of claim 21, wherein the plurality of storage devices are a plurality of physical storage devices.

25. The storage system of claim 21, wherein the data bridge virtual storage device is reserved for internal use by the storage system.

26. A storage system comprising:
   a plurality of storage devices;
   a data bridge virtual storage device;
   an interface; and
   a controller, wherein the controller has a plurality of modes of operation including:
      a first mode of operation in which the controller monitors the interface for data targeted for the data bridge virtual storage device from another storage system; and
      a second mode of operation, responsive to detecting data targeted for the data bridge virtual storage device, in which the controller relocates the data targeted for the data bridge virtual storage device to target storage devices within the plurality of storage devices.

27. The storage system of claim 26, wherein the data is received from a source and wherein the controller further includes:
   a third mode of operation, responsive to transferring the data to target storage devices, in which the controller generates status information regarding the transfer; and
   a fourth mode of operation, responsive to generating status information, in which the controller sends the status information to the source.

28. The storage system of claim 26, wherein the data is transferred to the target storage devices using information associating the data with the target devices.

29. A data processing system comprising:
   a network;
   a primary storage system including:
      a plurality of storage devices;
      a primary data bridge virtual storage device; and
      an interface connected to the network;
   a secondary storage system including:
      a plurality of storage devices;
      a secondary data bridge virtual storage device; and
      an interface connected to the network; and
   a host computer,
   wherein writing of data to a set of storage devices in the primary storage system initiates placing the data onto the primary data bridge virtual storage device associating information identifying target storage devices associated with the set of storage devices, establishing a data path through the network from the primary storage system to the secondary storage system, sending the data from the primary data bridge virtual storage device to the secondary data bridge virtual storage device using the data path, relocating the data from the secondary data bridge virtual storage device to target storage devices.

30. The data processing system of claim 29, wherein the network is a wide area network.

31. The data processing system of claim 29, wherein the network is an enterprise systems connection ESCON communications path.

32. The data processing system of claim 29, wherein the network is a local area network.

33. The data processing system of claim 29, wherein the secondary storage system returns status information in response to transferring the data to the target storage devices.

34. A data processing system comprising:
   a first storage system including a first plurality of storage devices;
   a second storage system including a second plurality of storage devices;
   communication means for establishing a data communication path between a primary data bridge virtual storage device in the first storage system and a secondary data bridge virtual storage device in the second storage system;
   placing means for placing data to be transferred from source storage devices within the first plurality of storage devices on the primary data bridge virtual storage device;
   sending means for sending the data from the primary data bridge virtual storage device to the secondary data bridge virtual storage device; and
   relocation means for relocating the data from the secondary data bridge virtual storage device to target storage devices within the second plurality of storage devices.

35. The data processing system of claim 34, wherein the primary data bridge virtual storage device is reserved for internal use by the first storage system and the secondary data bridge virtual storage device is reserved for internal use by the second storage system.

36. The data processing system of claim 34, wherein the data communication path is maintained until transfer of data from the source storage devices and the target storage devices has been completed.

37. The data processing system of claim 34, wherein the data communication path is a network link.

38. The data processing system of claim 34, wherein the placing means is a first placing means, the transferring means is a first transferring means, and further comprising:
   generation means for generating status information for a status of data transferred to the target storage devices;
   second placing means for placing the status information on a primary status bridge virtual storage device within the second storage system; and
   second transferring means for transferring the status information to a secondary status bridge virtual storage device in the first storage system.

39. The data processing system of claim 38, wherein transfer of data and transfer of status information occurs asynchronously.

40. The data processing system of claim 38, wherein the transferring the status information includes:
   establishing means for establishing a communication path between the primary status bridge virtual storage device and the secondary status bridge virtual storage device; and
   sending means for sending the status information from the primary status bridge virtual storage device to the secondary status bridge virtual storage device using the status communication path.

41. The data processing system of claim 34, wherein the first plurality of storage devices and the second plurality of storage devices are physical devices.

42. The data processing system of claim 41, wherein the physical devices are disk drives.

43. The data processing system of claim 34, wherein the first plurality of storage devices and the second plurality of storage devices are virtual devices.

44. An apparatus for transferring data from a first storage system to a second storage system, wherein the first storage system having a first plurality of storage devices and the second storage system having a second plurality of storage devices, the method comprising:

establishing means, responsive to a request to transfer data from source storage devices within the first plurality of storage devices to target storage devices within the second plurality of storage devices, for establishing a link between a primary bridge virtual volume in the first storage system and a secondary bridge virtual volume in the second storage system;

placing means for placing data from the source storage devices on the primary bridge virtual volume;

sending means for sending the data from primary bridge virtual volume to the secondary bridge virtual volume using the link; and relocating means for relocating the data from the secondary bridge virtual volume to the target storage devices.

45. The apparatus of claim 44 further comprising:

first configuring means for configuring a first virtual storage device within the first plurality of storage devices as the primary bridge virtual volume; and second configuring means for configuring a first virtual storage device within the second plurality of storage devices as the secondary bridge virtual volume.

46. The apparatus of claim 44, wherein the link is a network link.

47. The apparatus of claim 44, wherein the placing means is a first placing means and the transferring means is a first transferring means and further comprising:

generating means for generating status information for a status of data transferred to the target storage devices;

second placing means for placing the status information on a primary status bridge virtual volume in the second storage system; and second relocating means for relocating the status information to a secondary status bridge virtual volume within the first storage system.

48. The apparatus of claim 44, wherein the first plurality of storage devices and the second plurality of storage devices are physical devices.

49. The apparatus of claim 48, wherein the physical devices are disk drives.

50. The apparatus of claim 44, wherein the first plurality of storage devices and the second plurality of storage devices are virtual devices.

51. The apparatus of claim 44, wherein the request is a write by a host to source storage devices in the first plurality of storage devices in the first storage system.

52. The apparatus of claim 44, wherein the sending means comprises:

placing means for placing the data into a data packet having a header and a payload, wherein the data is contained in the payload and information used to save and convert the data to the target storage devices is contained in the header; and sending means for sending the plurality of data packets from the primary bridge virtual volume to the secondary bridge virtual volume using the link.

53. The apparatus of claim 44, wherein the data comprises a plurality of tracks and wherein the placing means associates the tracks as a group and wherein the sending means sends the group from the primary bridge virtual volume to the secondary bridge virtual volume using the link.

54. A computer program product in a computer readable medium for transferring data from a first storage system to a second storage system, wherein the first storage system includes a first plurality of storage devices and the second storage system includes a second plurality of storage devices, the computer program product comprising:

first instructions for establishing a data communication path between a primary data bridge virtual storage device in the first storage system and a secondary data bridge virtual storage device in the second storage system;

second instructions for placing data to be transferred from source storage devices within the first plurality of storage devices on the primary data bridge virtual storage device;

third instructions for sending the data from the primary data bridge virtual storage device to the secondary data bridge virtual storage device; and fourth instructions for relocating the data from the secondary data bridge virtual storage device to target storage devices within the second plurality of storage devices.

55. A computer program product in a computer readable medium for transferring data from a first storage system to a second storage system, wherein the first storage system having a first plurality of storage devices and the second storage system having a second plurality of storage devices, the computer program product comprising:

first instructions, responsive to a request to transfer data from source storage devices within the first plurality of storage devices to target storage devices within the second plurality of storage devices, for establishing a link between a primary bridge virtual volume in the first storage system and a secondary bridge virtual volume in the second storage system;

second instructions for placing data from the source storage devices on the primary bridge virtual volume;

third instructions for sending the data from primary bridge virtual volume to the secondary bridge virtual volume using the link; and fourth instructions for relocating the data from the secondary bridge virtual volume to the target storage devices.

* * * * *